US012116941B1

(12) United States Patent
Juchems et al.

(10) Patent No.: US 12,116,941 B1
(45) Date of Patent: Oct. 15, 2024

(54) VALVE TIMING DETECTION IN FUEL SYSTEM USING OFF CYCLE SWEEP

(71) Applicant: Caterpillar Inc., Peoria, IL (US)

(72) Inventors: Mitchell B. Juchems, Eureka, IL (US); Daniel R. Puckett, Peoria, IL (US); Andrew O. Marrack, Peoria, IL (US); Kaushik Krishnamurthy, Manteno, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/228,845

(22) Filed: Aug. 1, 2023

(51) Int. Cl.
*F02D 1/18* (2006.01)
*F02D 41/00* (2006.01)

(52) U.S. Cl.
CPC ............ *F02D 1/18* (2013.01); *F02D 41/009* (2013.01)

(58) Field of Classification Search
CPC ................................ F02D 41/009; F02D 1/18
See application file for complete search history.

(56) References Cited

U.S. PATENT DOCUMENTS

| | | | |
|---|---|---|---|
| 7,469,679 B2 | 12/2008 | Caterpillar | |
| 9,719,453 B2 | 8/2017 | Woodward | |
| 10,234,496 B2 | 3/2019 | Woodward | |
| 11,313,338 B1 * | 4/2022 | Marrack | F02D 41/20 |
| 11,859,584 B2 * | 1/2024 | Nakai | F02M 59/368 |
| 2013/0243608 A1 * | 9/2013 | Sakamoto | F02D 41/20 417/26 |
| 2021/0140386 A1 | 5/2021 | Caterpillar | |
| 2021/0231074 A1 | 7/2021 | Delphi | |

FOREIGN PATENT DOCUMENTS

WO 2022171818 A1 8/2022

* cited by examiner

*Primary Examiner* — Kevin A Lathers
(74) *Attorney, Agent, or Firm* — Brannon Sowers & Cracraft PC

(57) ABSTRACT

Operating a fuel system for an engine includes moving a plunger during a pumping cycle between an advanced position and a retracted position, and pulsing a solenoid actuator in an electrical circuit during at least one off cycle of the plunger where the plunger is neither advancing nor retracting with a plurality of current pulses of varied duration. An electrical property such as a freewheeling response in the electrical circuit induced by moving a valve in response to each respective current pulse is monitored, and a valve timing of the valve determined based on the monitored electrical property. The fuel system including a fuel injector may be electronically trimmed based on the determined valve timing. Related apparatus and control logic is also disclosed.

20 Claims, 3 Drawing Sheets

VALVE TIMING DETECTION IN FUEL SYSTEM USING OFF CYCLE SWEEP

TECHNICAL FIELD

The present disclosure relates generally to operating a fuel system for an engine, and more particularly to determining a valve timing of a valve in a fuel system based on an induced electrical property in a solenoid actuator electrical circuit.

BACKGROUND

Internal combustion engine systems employ a range of operating and logic strategies for controlling associated fuel systems. In a typical fuel system, a plurality of fuel injectors are each associated with a different combustion cylinder. The fuel injectors are typically electronically controlled and receive control currents generated by an engine or fuel control system. The control currents energize solenoids or other electrical actuators for the fuel injectors to adjust valves therein to determine timing and manner of fuel injection.

One widely adopted fuel system configuration used in compression-ignition diesel engines employs a direct-operated nozzle check opened and closed to start and end fuel injection at timings based on hydraulic pressure applied to a surface of the nozzle check. A spill valve in certain of such fuel injectors varies connection between a plunger cavity and a low-pressure space or outlet. When the spill valve is open, a plunger in the fuel injector reciprocates passively to exchange fuel between a plunger cavity and the low-pressure space. With the spill valve closed the plunger can pressurize fuel in the fuel injector.

Engineers have experimented for decades with various strategies for energizing and controlling electrical actuators for valves in fuel injectors. Precise control over fuel injection timing and so-called fuel injection rate shape can result in various desirable properties related to fuel injection timing, injection rate, pressure, and still others. The performance of individual fuel injectors can change over the course of a service life, sometimes resulting in valve operational changes in response to control currents that can impact fuel injection amount, timing, rate shape, or other factors. Electronic trimming techniques are often used in an effort to shift fuel injection parameters that have changed over time toward a desired state. Engineers are continually seeking new and improved strategies to monitor and control specific aspects of fuel injector operation, including strategies for electronic trimming. United States Patent Application Publication No. US20210140386A1 illustrates a typical spill valve fuel injector arrangement.

SUMMARY OF THE INVENTION

In one aspect, a method of operating a fuel system for an engine includes moving a plunger in a fuel system during a pumping cycle of the plunger between an advanced position and a retracted position. The method further includes pulsing a solenoid actuator in an electrical circuit during at least one off cycle of the plunger with a plurality of current pulses of varied duration, and monitoring an electrical property in the electrical circuit induced by moving a valve between a first position and a second position in response to each respective one of the plurality of current pulses. The method still further includes determining a valve timing of the valve based on the monitored electrical property.

In another aspect, a fuel system includes a fuel pump having a plunger movable between an advanced position and a retracted position in a plunger cavity formed in a housing, and a spill valve movable between an open position and a closed position to open and close, respectively, fluid communication between the plunger cavity and a fuel port formed in the housing. The fuel system further includes a control valve assembly having a solenoid actuator, and a control valve movable in the housing in response to energizing the solenoid actuator. The fuel system further includes a control system having an electrical circuit including the solenoid actuator, and an electronic control unit. The electronic control unit is structured to pulse the solenoid actuator with a plurality of current pulses of varied duration while the spill valve is at the open position, and to monitor an electrical property in the electrical circuit induced by moving the control valve between a first position and a second position in response to each respective one of the plurality of current pulses. The electronic control unit is still further structured to determine a valve timing of the control valve based on the monitored electrical property.

In still another aspect, a fuel control system includes an electronic control unit structured to pulse a solenoid actuator in a fuel system with a plurality of current pulses during at least one off cycle of a plunger in the fuel system, and monitor an electrical property in an electrical circuit including the solenoid actuator induced by moving a valve in the fuel system in response to each respective one of the plurality of current pulses. The electronic control unit is still further structured to determine a valve timing of the valve based on the monitored electrical property, and to electronically trim the valve based on the determined valve timing.

DETAILED DESCRIPTION

Figure 1:
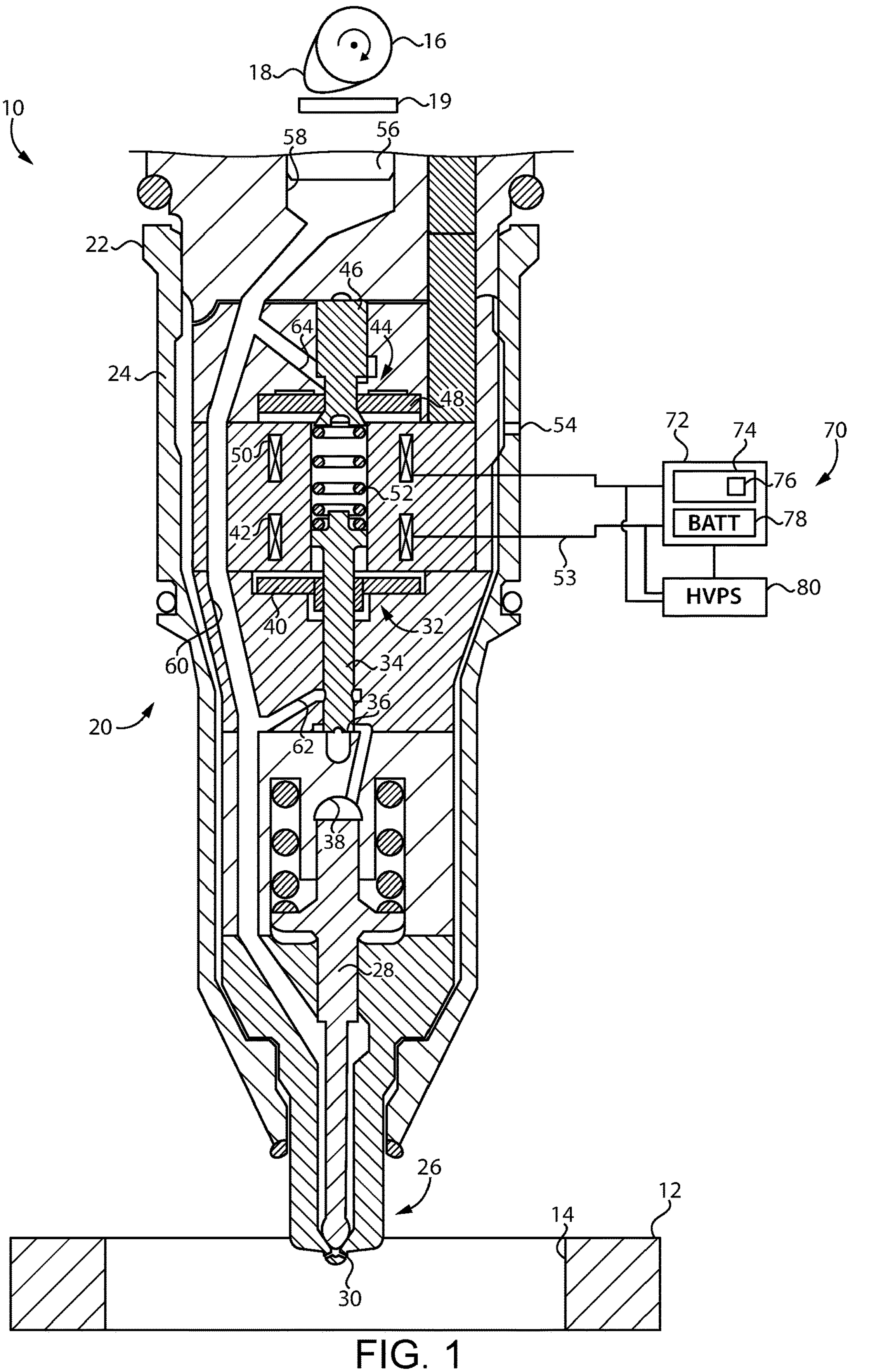
FIG. 1 is a sectioned diagrammatic view of an internal combustion engine system, according to one embodiment.

Referring to FIG. 1, there is shown an internal combustion engine system 10, according to one embodiment. Engine system 10 includes an internal combustion engine 12 having a combustion cylinder 14 formed therein.

Combustion cylinder 14 may be one of any number of combustion cylinders in engine 12 in any suitable arrangement such as an in-line pattern, a V-pattern, or still another. Engine 12 will typically be equipped with an intake system, an exhaust system, engine valves, and various other apparatus not explicitly shown. A piston will be movable in combustion cylinder 14 between a top-dead-center position and a bottom-dead-center position, typically in a conventional four-cycle pattern. Engine 12 may be compression-ignited and operated on a suitable compression-ignition fuel such as a diesel distillate fuel although the present disclosure is not thereby limited. Engine 12 may also include a rotatable crankshaft (not shown) coupled by way of a geartrain with a rotatable camshaft 16 having a cam lobe 18 and defining a base circle 17. Camshaft 16 will typically include a plurality of cam lobes arranged to operate equipment including fuel injectors in engine system 10 as further discussed.

Engine system 10 further includes a fuel system 20. Fuel system 20 will typically include a plurality of fuel injectors each positioned to extend into one of a plurality of combustion cylinders in engine 12. In FIG. 1, one fuel injector 22 is shown associated with combustion cylinder 14, and it will be appreciated that description and discussion of fuel injector 22 should be understood to refer by way of analogy to any other such fuel injectors in engine system 10. Fuel injector 22 includes an injector housing 24 having a nozzle 26 that extends into combustion cylinder 14 and sprays fuel into combustion cylinder 14 by way of a plurality of nozzle outlets 30 formed in nozzle 26.

Fuel injector 22 also includes a direct operated check or DOC 28 movable in injector housing 24 to open and close nozzle outlets 30 to directly inject a liquid fuel. DOC 28 is directly hydraulically operated on the basis of a fluid pressure, typically a fluid pressure of fuel, in a pressure control chamber 38. In the illustrated embodiment, DOC 28 includes a needle valve or needle check.

Fuel injector 22 also includes an injection control valve assembly 32. Injection control valve assembly 32 is operable to control a closing hydraulic pressure in pressure control chamber 38 to enable opening and closing of DOC 28. Injection control valve assembly 32 includes an injection control valve 34 movable in fuel injector 22 to open and close a valve seat 36. Injection control valve 34 could include one or more valves, including separate but contacting valve members in some embodiments. When valve seat 36 is opened, pressure control chamber 38 can fluidly connect to a low-pressure space 54 such as a fuel port defined by injector housing 24 enabling DOC 28 to open in response to fuel pressure and permit spraying of fuel from nozzle outlets 30. When valve seat 36 is closed an increased hydraulic pressure is seen in pressure control chamber 38 and causes DOC 28 to close. An armature 40 is coupled with injection control valve 34. Armature 40 is associated with a solenoid actuator 42 that can be energized to magnetically attract armature 40 and open valve seat 36. When solenoid actuator 42 is deenergized a biasing spring 52 urges injection control valve 34 closed against valve seat 36. Injection control valve 34 is thus movable between a first position and a second position in fuel injector 22. In an embodiment, the first position includes a closed stop position and the second position includes an open stop position. When solenoid actuator 42 is deenergized a biasing spring 52 urges injection control valve 34 closed against valve seat 36. Injection control valve 34 is thus movable in fuel injector 32 in response to energizing solenoid actuator 42 to vary a closing hydraulic pressure on DOC 28.

Fuel injector 22 also includes a spill valve assembly 44. Spill valve assembly 44 includes a spill valve 46 coupled with an armature 48 and a solenoid actuator 50. When solenoid actuator 50 is energized armature 48 is magnetically attracted towards solenoid actuator 50. When solenoid actuator 50 is deenergized biasing spring 52 urges armature 48 and spill valve 46 away from solenoid actuator 50. Spill valve 46 is thus understood to be movable in fuel injector 22 in response to energizing solenoid actuator 50, and is biased toward an open position. In other embodiments, rather than a single spring acting to bias both armature 40 and armature 48 separate springs might be used. Moreover, embodiments are contemplated where spill valve 46 is positioned outside of fuel injector housing 24.

Fuel injector 22 further includes a plunger 56 movable in a plunger cavity 58 formed in an injector housing 24 and fluidly connected to spill valve 46 by way of a spill passage 64. In an implementation plunger 56 is mechanically cam-actuated by way of rotation of camshaft 16. In a pumping cycle of plunger 56, camshaft 16 is rotated to engage cam lobe 18 against a tappet 19 coupled to plunger 56. Rotation of camshaft 16 urges tappet 19 away from camshaft 16 to move plunger 56 during a pumping cycle of plunger 56 between an advanced position and a retracted position. Camshaft 16 also defines base circle 17. When base circle 17 rotates in contact with tappet 19 plunger 56 is understood to be in an off cycle neither advancing nor retracting. When spill valve 46 is open, upward movement of plunger 56 causes fuel to be drawn into plunger cavity 58 such as by way of spill passage 64 from low-pressure space or fuel port 54. Downward movement of plunger 56, advancing, causes the fuel to be discharged from plunger cavity 58 through spill passage 64. When spill valve 46 is closed fluid communication between plunger cavity 58 and fuel port 54 is blocked and advancement of plunger 56 causes fuel pressure in plunger cavity 58 to increase. The increased fuel pressure is communicated by way of a nozzle supply passage 60 to the vicinity of nozzle outlets 30. The increased fuel pressure is likewise communicated to pressure control chamber 38 holding DOC 28 closed. When DOC 28 is lifted, at a desired timing by opening injection control valve assembly 32, fuel sprays from nozzle supply passage 60 out of nozzle outlets 30. Another fluid passage 62 fluidly connects between nozzle supply passage 60 and injection control valve 34.

As illustrated in the drawings and noted above, spill valve assembly 44 is resident is fuel injector 22 but in other embodiments could be positioned externally. Moreover, plunger 56 may be understood to form part of a fuel pump used to pressurize fuel for a single fuel injector. In other embodiments a plunger in a fuel pump could be employed to pressurize fuel for multiple fuel injectors. It should further be appreciated that while tappet 19 may form a direct mechanical connection between camshaft 16 and plunger 56, in other embodiments intervening structures such as a rocker arm assembly could also be used.

Fuel system 20 also includes a fuel control system 70. Fuel control system 70 includes an electronic control module or ECM 72 including an electronic control unit or ECU 74. ECU 74 may be, or may include, a programmable logic controller such as a microprocessor or a microcontroller, and suitable computer readable memory storing program control instructions which upon execution cause fuel injector 22 and fuel system 20 to operate according to the present disclosure. Any suitable computer readable memory such as RAM, ROM, flash, a hard drive, or still others may be used. Fuel control system 70 also includes a lower voltage power supply such as a battery 78, and a boosted voltage power supply 80. Battery 78 is shown as part of ECM 72 but could be a separate apparatus. Boosted voltage power supply 80 may be part of an ECM or physically separated in other embodiments. An electrical circuit 53 electrically connects to ECM 72 and ECU 74 and includes solenoid actuator 42.

The concept of electronic trimming will be familiar to those skilled in the art. In the fuel systems control field electronic trimming can be used to vary the timing, duration, amplitude, and potentially other properties of electrical control currents sent to electrical actuators in a fuel injector to improve or optimize fuel injector performance parameters including, for example, valve opening timing, valve closing timing, and injection rate shapes. The present disclosure provides a unique valve timing detection and determination strategy enabling electronic trimming to improve fuel injector performance. One example control target for electronic trimming can include a valve opening timing, for example, a timing at which a valve reaches a fully opened position. Electronic trimming according to the present disclosure might include varying a start of current timing for energizing solenoid actuator 42 to produce a valve timing that is as close as practicable to a nominal valve timing, as further discussed herein.

To this end, electronic control unit 74 may be structured to determine a valve timing of a valve in fuel system 20 by way of an off cycle sweep strategy. As discussed above, when base circle 17 is rotated in contact with tappet 19 plunger 56 is idle. Spill valve 46 will typically also be in an open position. Fuel injector 22 is not operated to inject fuel. It has been discovered that evaluation of valve timing, particularly of control valve 34, can be performed in such circumstances to precisely detect a valve opening timing that can serve as a basis for electronic trimming of fuel injector 22 including electronic trimming of control valve 34. In an off cycle DOC 28 does not move and therefore control valve 34 can be opened and closed to observe its performance without interaction, or with minimal interaction, with hydraulic pressures or other phenomena in fuel injector 22. An off cycle sweep can include generating a plurality of electrical currents in electrical circuit 53 having a varied duration to pulse solenoid actuator 42 during at least one off cycle, where plunger 56 is neither advancing nor retracting and spill valve 46 is open. Electronic control unit 72 may be further structured to monitor an electrical property in electrical circuit 53 induced by moving control valve 34 between its first position and its second position in response to each respective one of the plurality of current pulses. As further discussed herein, a valve timing of control valve 34 is determined based on the monitored electrical property.

The monitored electrical property may include a freewheeling response in electrical circuit 53, and in an embodiment a duration of the freewheeling response. The freewheeling response durations resulting from the pulses of current may be indicative of a plurality of different time durations to move control valve 34 between its first position and its second position, such as a time duration to return control valve 34 to the first position. As noted above, the first position may include a closed stop position and the second position may include an open stop position. The plurality of different time durations may include a plurality of valve closing time (VCT) durations. Determining a valve timing may thus include determining a valve opening time (VOT) duration to move control valve 34 from the closed stop position to the open stop position. Further, and as also discussed below, the plurality of VCT durations may include a $VCT_{max}$ duration, and the determined VOT duration may be based on the $VCT_{max}$ duration. Pulsing of solenoid actuator 42 may include pulsing solenoid actuator 42 with a plurality of current pulses of successively increased or successively decreased duration.

Figure 2:
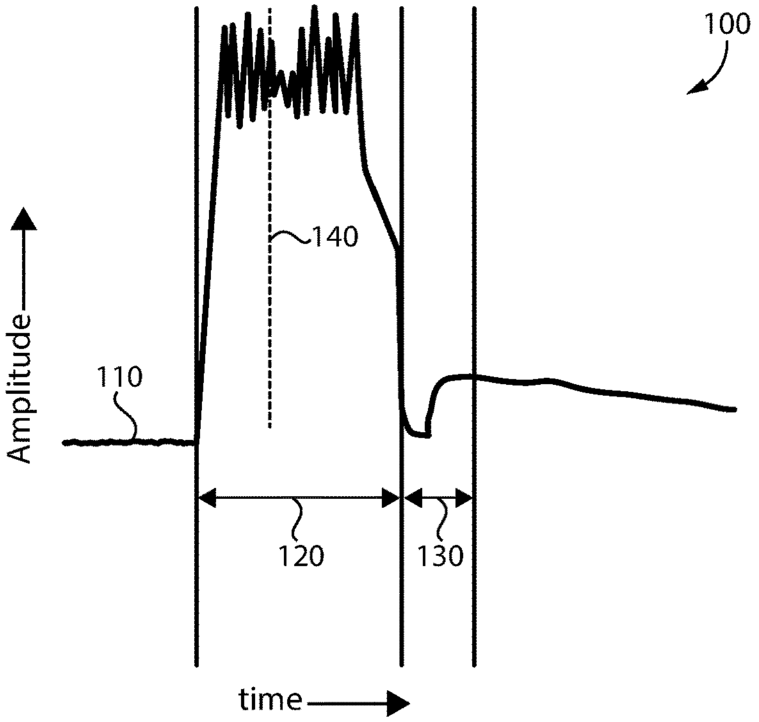
FIG. 2 is a graph of an electrical current pulse, according to one embodiment.

Referring now to FIG. 2, there is shown a graph 100 illustrating an example current pulse waveform that might be generated in electrical circuit 53 to energize solenoid actuator 42. Electrical control current is shown at 110. Valve arrival is shown at 140. The valve arrival 140 may reflect a timing of control valve 34 reaching its second position as discussed herein. Numeral 120 identifies a pulse duration. Numeral 130 shows a timing window where control valve 34 returns to the first position. During operating fuel system 20 to inject fuel, during a pumping cycle of plunger 56, a current pulse similar to that depicted in FIG. 2 might be generated each time control valve 34 is to be opened. During operating fuel system 20 to perform an off cycle sweep, during one or more off cycles of plunger 56, a plurality of current pulses similar to that depicted in FIG. 2 are produced, but are varied in duration as discussed herein. To electronically trim control valve 34 once valve timing is established, start of current timing of control current 110 can be advanced or retarded to advance or retard valve arrival timing 140, reducing errors in fuel injection amount or rate shape by shifting fuel injection amount or rate shape closer to a nominal condition. The present disclosure contemplates pulsing electrical circuit 53 and solenoid actuator 42 a plurality of times, monitoring an induced electrical property in circuit 53, and determining which incidents of monitored electrical property represent a duration of current pulse that corresponds to VOT duration. The phenomena will be further apparent upon consideration of FIG. 3.

Figure 3:
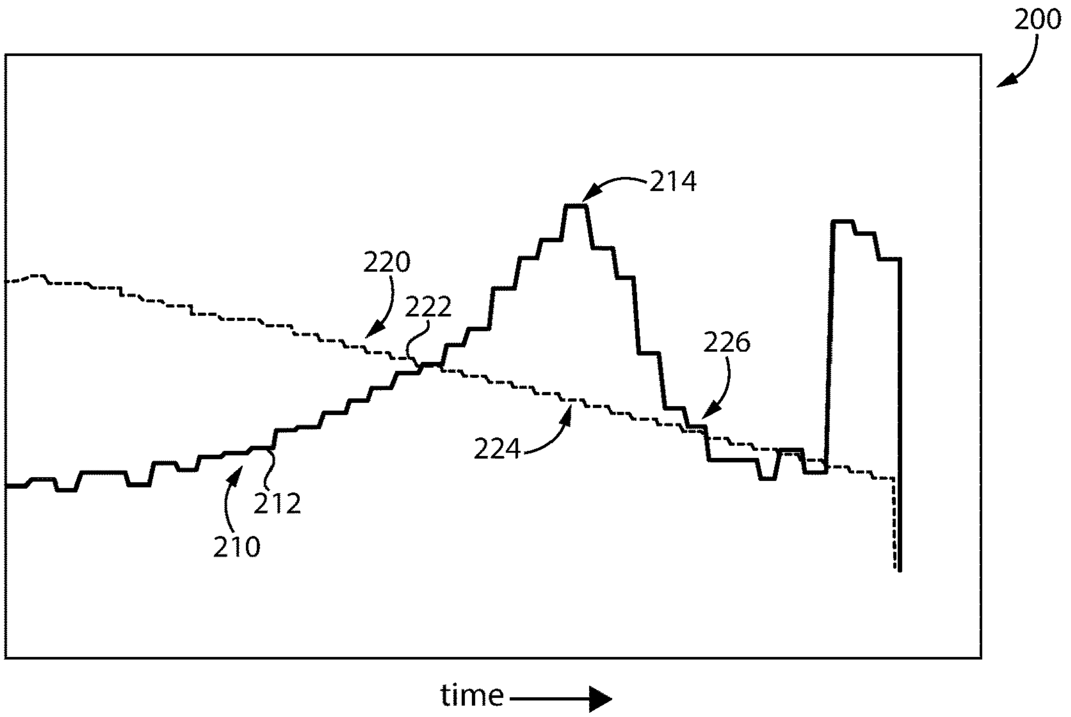
FIG. 3 is another graph illustrating an off cycle sweep, according to one embodiment.

Referring now to FIG. 3, there is shown a trace 220 representing a plurality of current pulses 222 energizing solenoid actuator 42 in circuit 53 that are successively increased in duration. A trace 210 includes a plurality of measurements 212 of freewheeling response duration, the monitored electrical property, that successively increase in duration up to a $VCT_{max}$ 214. Corresponding to $VCT_{max}$ 214 is a VOT duration 224, meaning VOT duration 224 is the duration of the current pulse that induces $VCT_{max}$. It will be appreciated that when control valve 34 and armature 40 are moving relative to solenoid actuator 42 a freewheeling response in electrical circuit 53 is produced. Relatively shorter current pulses in electrical circuit 53 may cause control valve 34 to move away from its closed stop position but return to the closed stop position before reaching its open stop position, that is, fully open. Longer current pulse durations can cause control valve 34 and armature 40 to reach the open stop position and bounce back toward the closed stop position. A current pulse duration that is sufficient for valve 34 and armature 40 to just reach the closed stop position and then return to the open stop position will tend to be a current pulse duration that causes a longest time duration for control valve 34 and armature 40 to complete its cycle of movement from the closed stop position to the open stop position and then back to the closed stop position. Put differently, $VCT_{max}$ is the longest duration valve closing timing because armature 40 traverses its full travel distance between the stop positions but does not bounce, or minimally so. Therefore the pulse duration that induces the longest duration valve closing time is substantially the same as the time duration it takes valve 32 to fully open. This discovery is leveraged according to the present disclosure to electronically trim fuel injector 22. The varied duration of pulses could be successively increased, successively decreased, or potentially varied according to some other pattern. With VOT determined, when fuel injector 22 is once again operated to inject fuel a start of current timing or potentially other properties such as current amplitude or end of current timing can be adjusted as discussed herein.

INDUSTRIAL APPLICABILITY

Figure 4:
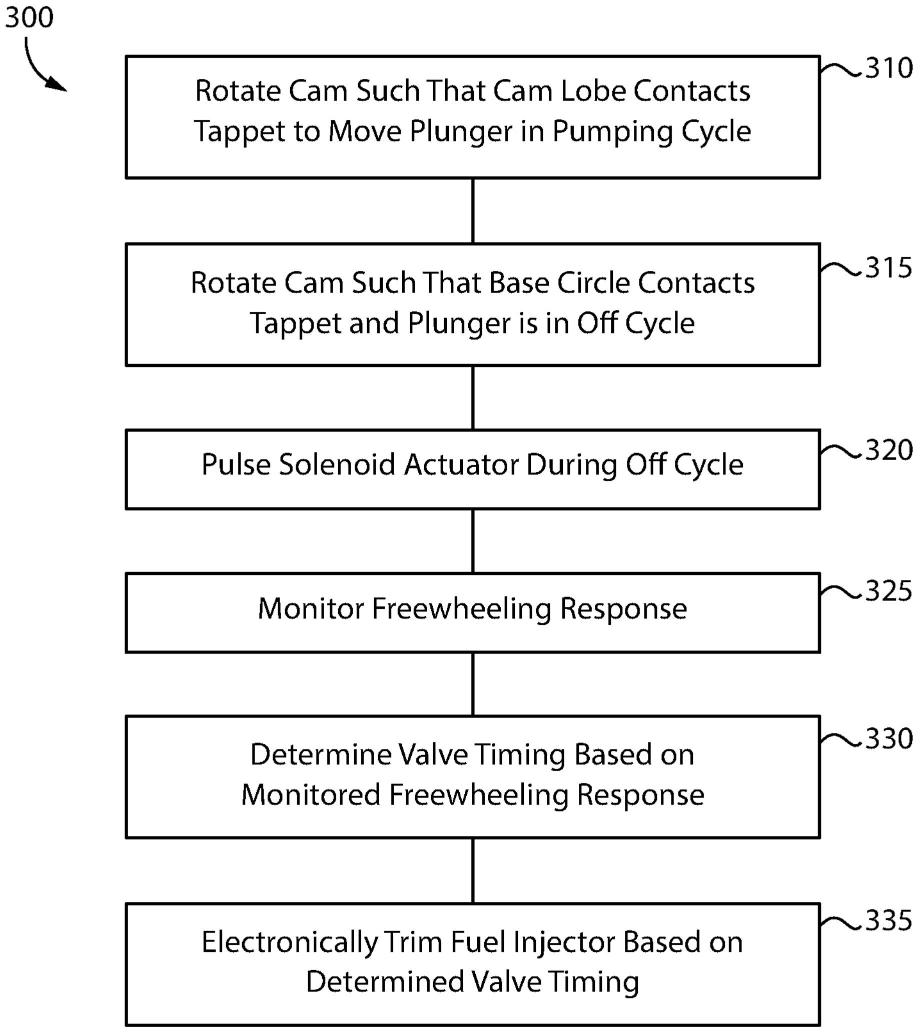
FIG. 4 is a flowchart illustrating example methodology and logic flow, according to one embodiment.

Still referring to the drawings generally, but focusing now on FIG. 4, there is shown a flowchart 300 illustrating example methodology and logic flow according to one embodiment. At a block 310 camshaft 16 is rotated such that cam lobe 18 contacts tappet 19 to move plunger 56 in a pumping cycle. In FIG. 1 camshaft 16 and tappet 19 are shown approximately as they might appear nearing the end of moving plunger 56 in a pumping cycle such that plunger 56 is retracting. From block 310 flowchart 300 advances to a block 315 to rotate camshaft 16 such that base circle 17 contacts tappet 19 and plunger 56 is in an off cycle. FIG. 1 illustrates camshaft 16 and tappet 17 as they might appear just prior to commencing the methodology of block 315.

From block 315 flowchart 300 advances to a block 320 to pulse solenoid actuator 42 during the off cycle. As discussed herein it will be appreciated that electrical circuit 53 is pulsed with a plurality of electrical currents to move valve 32 between its first position and second position in response to each respective one of the plurality of current pulses. It is contemplated that an off cycle sweep employing a plurality of pulses may take place during one revolution of camshaft 16. The present disclosure is not thereby limited, however, and in other instances multiple successive off cycles could be used to perform the plurality of pulses of varied duration. At a block 325 the freewheeling response is monitored in electrical circuit 53. Monitoring the freewheeling response can include monitoring a duration during which a back EMF is produced in circuit 53 in response to relative motion between armature 40 and solenoid actuator 42. Monitoring the freewheeling response does not require that the back EMF itself be measured, but instead the time duration during which back EMF is produced. From block 325 flowchart 300 advances to a block 330 to determine valve timing based on the monitored freewheeling response. As discussed herein, electronic control unit 72 monitors the freewheeling response to determine VCT max corresponding to the longest duration of valve closing timing. From block 330 flowchart 300 advances to a block 335 to electronically trim fuel injector 22 and valve 34 based on the determined valve timing. Block 335 can be executed by actually performing the electronic trimming or, for example, by updating trim tables or other data structures that are used in electronically trimming fuel injector 22.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a fuel system for an engine comprising:
 - moving a plunger in a fuel system during a pumping cycle of the plunger between an advanced position and a retracted position;
 - pulsing a solenoid actuator in an electrical circuit during at least one off cycle of the plunger with a plurality of current pulses of varied duration;
 - monitoring an electrical property in the electrical circuit induced by moving a valve between a first position and a second position in response to each respective one of the plurality of current pulses; and
 - determining a valve timing of the valve based on the monitored electrical property.

2. The method of claim 1 wherein the monitoring an electrical property includes monitoring a freewheeling response duration.

3. The method of claim 2 wherein the monitored freewheeling response duration is indicative of a plurality of different time durations to move the valve between the first position and the second position.

4. The method of claim 3 wherein the first position includes a closed stop position and the second position includes an open stop position, and the plurality of different time durations includes a plurality of valve closing time (VCT) durations.

5. The method of claim 4 wherein the determining a valve timing includes determining a valve opening time (VOT) duration to move the valve from the closed stop position to the open stop position.

6. The method of claim 5 wherein the plurality of VCT durations includes a $VCT_{max}$ duration, and the determined VOT duration is based on the $VCT_{max}$ duration.

7. The method of claim 1 wherein the pulsing a solenoid actuator includes pulsing the solenoid actuator with a plurality of current pulses of successively increased or successively decreased duration.

8. The method of claim 1 wherein the valve includes an injection control valve in a fuel injector, and the moving the plunger includes moving the plunger in response to rotation of a cam.

9. The method of claim 8 wherein the fuel injector includes an outlet check in a closed position during the at least one off cycle of the plunger, and a spill valve in an open position during the at least one off cycle of the plunger.

10. A fuel system comprising:
 - a fuel pump including a plunger movable between an advanced position and a retracted position in a plunger cavity formed in a housing;
 - a spill valve movable between an open position and a closed position to open and close, respectively, fluid communication between the plunger cavity and a fuel port formed in the housing;
 - a control valve assembly including a solenoid actuator, and a control valve movable in the housing in response to energizing the solenoid actuator;
 - a control system having an electrical circuit including the solenoid actuator, and an electronic control unit, the electronic control unit being structured to:
   - pulse the solenoid actuator with a plurality of current pulses of varied duration while the spill valve is at the open position;
   - monitor an electrical property in the electrical circuit induced by moving the control valve between a first position and a second position in response to each respective one of the plurality of current pulses; and
   - determine a valve timing of the control valve based on the monitored electrical property.

11. The fuel system of claim 10 wherein the valve timing includes a valve opening time (VOT) duration.

12. The fuel system of claim 11 wherein the first position includes a closed stop position and the second position includes an open stop position.

13. The fuel system of claim 11 wherein the monitored electrical property is indicative of a plurality of different valve closing time (VCT) durations.

14. The fuel system of claim 13 wherein the monitored electrical property includes a freewheeling response.

15. The fuel system of claim 13 wherein the plurality of VCT durations includes a $VCT_{max}$ duration, and the determined VOT duration is based on the $VCT_{max}$ duration.

16. The fuel system of claim 13 further comprising a fuel injector including the control valve assembly, an outlet check operably coupled to the control valve, and a cam rotatable to move the plunger between the advanced position and the retracted position; and the electronic control unit is further structured to perform the pulsing of the solenoid actuator and the monitoring of the electrical property during at least one off cycle of the plunger.

17. A fuel control system comprising:

an electronic control unit structured to:

pulse a solenoid actuator in a fuel system with a plurality of current pulses during at least one off cycle of a plunger in the fuel system;

monitor an electrical property in an electrical circuit including the solenoid actuator induced by moving a valve in the fuel system in response to each respective one of the plurality of current pulses;

determine a valve timing of the valve based on the monitored electrical property; and electronically trim the valve based on the determined valve timing.

18. The fuel control system of claim 17 wherein the valve timing includes a valve opening timing.

19. The fuel control system of claim 18 wherein the monitored electrical property is indicative of a plurality of different valve closing time (VCT) durations.

20. The fuel control system of claim 19 wherein the plurality of VCT durations includes a $VCT_{max}$ duration, and the valve opening timing includes a valve opening time (VOT) duration that is based on the $VCT_{max}$ duration.

* * * * *